United States Patent Office 2,931,889
Patented Apr. 5, 1960

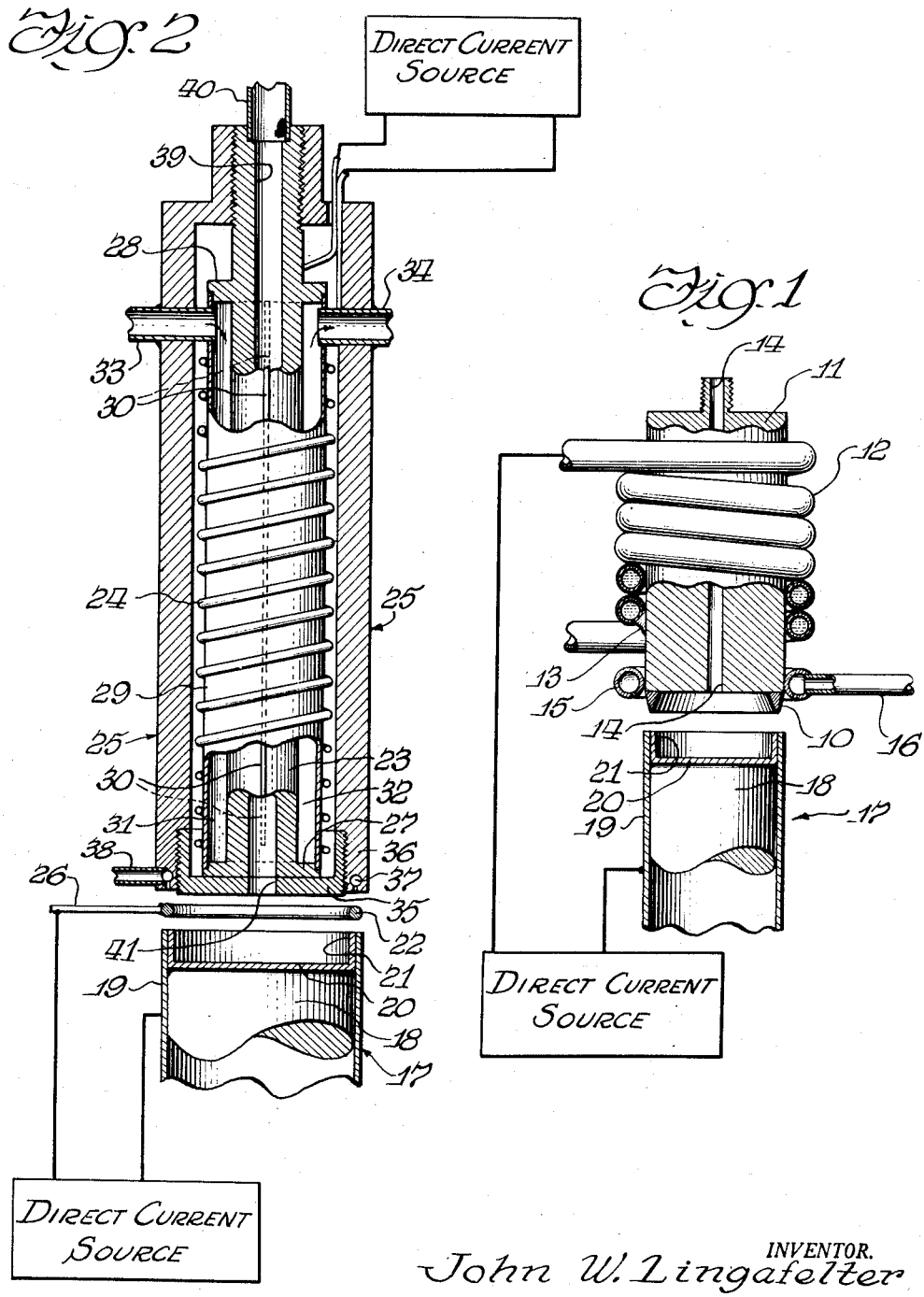

2,931,889

APPARATUS FOR ARC WELDING

John W. Lingafelter, Richland, Wash., assignor to the United States of America as represented by the United States Atomic Energy Commission Application January 25, 1956, Serial No. 561,372

3 Claims. (Cl. 219—123)

This invention relates to a novel apparatus for welding and more particularly, to the formation of welds of appreciable length and extent.

The present apparatus is particularly useful in the joining of an end closure to a container. The weld between a closure and a container, if performed at the periphery or outer edges of the closure, will have considerable length. In an arrangement by which the welding arc is moved along, or around the closure and container to be joined, there may actually be a large number of successive welds one after another which will have oxide defects or occlusions spread along the line of welding due to the melting and remelting of the metal arising from the successive welds. The present apparatus avoids these defects by providing a welding arc moving so rapidly along the line or path to be welded that there is in effect a single weld being performed over the entire welding path and thus remelting does not occur.

According to the present invention, a welding arc created between an annular electrode and a workpiece moves under the influence of an electromagnetic field about the electrode in a closed or annular path. This mode of welding is specially suited to the enclosing of nuclear-fuel slugs in a protective casing. For example, a uranium slug is placed in an aluminum can, and an aluminum closure is welded to the open end of the can along a closed or annular path conforming to the periphery of the end closure.

In the drawing:

Fig. 1 is an elevational view, partly in section, of one form of the novel welding apparatus of the present invention; and Fig. 2 is a vertical sectional view of a second form of the welding apparatus.

The welding apparatus of Fig. 1 comprises an annular welding electrode 10, a core 11, and a coil 12. The electrode 10 is formed of a suitable refractory material such as molybdenum, tungsten, or graphite. The core 11 is formed of magnetic material such as soft iron. The coil 12 is formed of a nonmagnetic, electrically conducting material such as copper and takes the form of tubing through which a liquid may be passed for cooling the core 11. The coil 12 is externally coated with an insulating material so that the turns of the coil are electrically insulated from one another and from the core, except that there is an electrical connection 13 between one end of the coil 12 and a region of the core 11 near one end thereof, which electrical connection may be formed by soldering or brazing.

The annular electrode 10 is soldered or welded to the end of the core 11 adjacent which the electrical connection 13 lies and has its axis coincident with that of the core. The core 11 has a longitudinal axial opening 14 through which an inert gas favorable to the welding of aluminum is supplied. This gas may be argon or a mixture of argon and helium. About the end of the core 11 adjacent the electrode 10 and radially outwardly thereof, there is attached a tubular perforated ring 15 which is of nonmagnetic material such as stainless steel. A supply line 16 of the same material is connected thereto. An inert gas of the same composition as that fed through the opening 14 in the core 11 is fed through the line 16 to the ring 15 from which it exits all around the electrode 10 through the perforations distributed about the ring 15.

Below and in spaced relation to the electrode 10 is positioned a workpiece 17 to be welded, which comprises a nuclear fuel slug 18, an aluminum can 19, and an aluminum end closure 20 having a peripheral flange 21. The workpiece 17 has its axis coincident with that of the annular electrode 10 so that the annular electrode is concentric with the open end of the can 19 and the flange 21 on the end closure 20. The diameter of the lower pointed end of the electrode 10 is of the order of those of the can 19 and end closure 20, being somewhat less than the outer diameter of the open end of the can 19 and somewhat more than that of the inner diameter of the flange 21 on the end closure 20.

In operation of the apparatus of Fig. 1 the workpiece 17 and the end of the coil 12 away from the connection 13 with the core 11 are connected with a direct-current source as indicated. An arc is initiated between the electrode 10 and the workpiece 17 by making a temporary contact between them or by the impression of a high-frequency voltage between the electrode and the workpiece. Once the arc is started, the high-frequency voltage is removed.

Two magnetic fields have been created: a first set up by the passage of welding current between the electrode 10 and the workpiece 17; and a second induced in the core 11 by the flow of welding current through the coil 12. The flux of the second field extends axially through the core 11 and the electrode 10 and radially through the space between the electrode 10 and the workpiece 17 so as to be perpendicular to the flux of the first field between the workpiece and the electrode.

The force resulting from the interaction of these two magnetic fields moves the welding arc at a very high speed around the electrode 10 so that a weld is produced between the open end of the can 19 and the closure flange 21 simultaneously over the entire annular region of contact between the can and the closure flange 21. The weld is of high quality and is free of occlusions that occur in welds produced by the rotation of an arc at relatively low speed about the workpiece, for example, by rotation of the workpiece and the welding torch or electrode with respect to one another.

The form of the welding apparatus of Fig. 2 comprises an annular electrode 22, a core 23, and a coil 24. The electrode 22 is formed of a suitable refractory material such as molybdenum, tungsten, or graphite. It is spaced from the core 23 and a container 25 for the core and may be supported by a rod 26 which constitutes an electrical lead for the electrode. The core 23 has a lower flange 27 at its lower end and an upper flange 28 near but somewhat spaced from its upper end. A sleeve 29, which may be formed of copper, surrounds the core 23 and has its ends attached to the flanges in soldered or welded connections. The sleeve 29 is spaced from the portions of the core 23 lying between the flanges 27 and 28, and diametrically opposed strips 30 extend longitudinally of the core 23 from the upper flange 28 to a region near but spaced from the lower flange 27 and radially of the core from the core to the sleeve 29 so that the space between the core and the sleeve is divided into two semi-cylindrical spaces 31 and 32 which are connected only at their lower ends by the spaces between the lower flange 27 and the lower ends of the strips 30. Inlet and outlet lines 33 and 34 for coolant extend through the container 25 and the sleeve 29 into the spaces 31 and 32, respectively, so that coolant for the core 23 flows downwardly along the core in the space 31, past the lower ends of the strips 30, and upwardly along the core in the space 32.

The coil 24, which is insulated, is wound around the sleeve 29 and has leads going through the upper end of the housing 25 which is formed of nonmagnetic material such as brass. The upper end of the core 23 goes through the upper end of the housing 25 in a threaded connection. The lower end of the core 23 rests on a base member 35 of the housing 25, which base member has a threaded connection with a tubular member 36 of the housing. The lower end of the tubular member 36 has an annular passage 37 with perforations on its lower side, and a supply line 38 is connected to the passage 37. The core 23 has an axial hole 39 which is connected at its upper end with a supply line 40 and registers at its lower end with a hole 41 in the base member 35. Inert gas or gases favorable to welding of aluminum are fed through the supply lines 38 and 40 into the annular passage 37 and the axial hole 39 and exits through the perforations in the annular passage and through the opening 41 in the housing base 35 at and within the annular electrode 22.

Below and in spaced relation to the electrode 22 is positioned a workpiece 17 to be welded, which is the same as the workpiece 17 of Fig. 1. The axis of the workpiece 17 is coincident with the center of the electrode 22 so that the electrode is concentric with the open end of the can 19 and the flange 21 on the end closure 20. The average of the inner and outer diameters of the electrode 22 is about equal to diameters of the closure flange 21 and the can 19 at their contacting surfaces.

In operation of the apparatus of Fig. 2, the workpiece 17 and the electrode 22 are connected with a direct-current source, and the coil 24 is connected to the same or a different direct-current source. An arc is initiated by a temporary contact between the electrode 22 and the workpiece 17 or by impression of a high-frequency voltage between the electrode and the workpiece. Once the arc is started, the high-frequency voltage is removed.

Welding of the closure flange 21 and the open end of the can 19 is produced by the welding arc between the electrode 22 and the workpiece 17, which arc moves very rapidly about the electrode because of the field set up by the coil 24 and that produced by the passage of welding current between the electrode and the workpiece. The weld is of the same high quality as that produced by the apparatus of Fig. 1.

It is also understood that the invention is not to be limited by the details given herein but that it may be modified within the scope of the appended claims.

What is claimed is:

1. A welding machine comprising an annular electrode, a magnetic core secured at one end to the electrode in an electrical connection and extending from one side thereof in alignment therewith, means for creating an arc between the electrode and the periphery of the end of a workpiece of the same size and shape as the electrode, the workpiece lying on the opposite side of the electrode from the core, and a coil for creating electromagnetic flux passing through the core and the electrode axially of the electrode and between the electrode and the workpiece radially of the electrode across the arc for rotating the arc about the electrode, said coil being wound upon the core and having an electrical connection with the core adjacent the said one end thereof.

2. The welding machine specified in claim 1, the coil having the form of hollow tubing through which a liquid may be passed for cooling the core.

3. The welding machine specified in claim 2, the core having an axial hole through which may be passed a gas favorable to welding, the welding machine further comprising a tubular perforated ring secured to the same end of the core as the electrode and outwardly thereof, and means for supplying to the ring a gas favorable to welding.

References Cited in the file of this patent
UNITED STATES PATENTS

| | | |
|---|---|---|
| 501,825 | Coffin | July 18, 1893 |
| 510,777 | Coffin | Dec. 12, 1893 |
| 515,652 | Coffin | Feb. 27, 1894 |
| 1,300,117 | Cadwell | Apr. 8, 1919 |
| 1,302,440 | Sarazin | Apr. 29, 1919 |
| 1,906,496 | Stine et al. | May 2, 1933 |
| 2,028,780 | Ito | Jan. 28, 1936 |
| 2,743,342 | Bettis | Apr. 24, 1956 |
| 2,809,277 | Breymeier | Oct. 8, 1957 |